(12) United States Patent
Kuhns

(10) Patent No.: US 7,882,384 B2
(45) Date of Patent: Feb. 1, 2011

(54) SETTING AND MINIMIZING A DERIVED CLOCK FREQUENCY BASED ON AN INPUT TIME INTERVAL

(75) Inventor: Mark D. Kuhns, Peoria, AZ (US)

(73) Assignee: National Semiconductor Corporation, Santa Clara, CA (US)

( * ) Notice: Subject to any disclaimer, the term of this patent is extended or adjusted under 35 U.S.C. 154(b) by 107 days.

(21) Appl. No.: 11/515,238

(22) Filed: Aug. 31, 2006

(65) Prior Publication Data

US 2008/0126823 A1 May 29, 2008

(51) Int. Cl.
G06F 1/00 (2006.01)
G06F 3/00 (2006.01)
(52) U.S. Cl. .................. 713/501; 345/204; 345/519; 345/520; 710/58; 710/60
(58) Field of Classification Search .............. 713/501
See application file for complete search history.

(56) References Cited

U.S. PATENT DOCUMENTS

| | | | | |
|---|---|---|---|---|
| 5,086,387 A * | 2/1992 | Arroyo et al. | ............... | 713/501 |
| 5,438,371 A * | 8/1995 | Gutsmann et al. | ........... | 348/492 |
| 5,751,665 A | 5/1998 | Tanoi | .......................... | 368/120 |
| 5,903,746 A * | 5/1999 | Swoboda et al. | ............ | 713/501 |
| 5,974,557 A * | 10/1999 | Thomas et al. | .............. | 713/322 |
| 6,018,803 A * | 1/2000 | Kardach | ..................... | 713/323 |
| 6,094,727 A * | 7/2000 | Manning | ..................... | 713/400 |
| 6,397,343 B1 * | 5/2002 | Williams et al. | ............ | 713/501 |
| 6,430,695 B1 * | 8/2002 | Bray et al. | .................. | 713/501 |
| 6,460,125 B2 * | 10/2002 | Lee et al. | ..................... | 711/167 |
| 6,636,205 B1 * | 10/2003 | Lasneski | ..................... | 345/204 |
| 7,149,909 B2 * | 12/2006 | Cui et al. | ..................... | 713/322 |
| 7,289,542 B2 * | 10/2007 | Schmandt | .................... | 370/516 |
| 2003/0056132 A1 | 3/2003 | Yatsuda et al. | .............. | 713/320 |
| 2009/0244375 A1 * | 10/2009 | Moehlmann et al. | ........ | 348/512 |
| 2010/0053123 A1 * | 3/2010 | Hori | ............................ | 345/204 |

FOREIGN PATENT DOCUMENTS

WO WO 9014732 A1 * 11/1990
WO 97/42731 A1 11/1997

* cited by examiner

Primary Examiner—Henry W Tsai
Assistant Examiner—Steven G Snyder

(57) ABSTRACT

An embodiment of the present invention is directed to a circuit including a data relay stage configurable to receive primary data via a primary data interface, a primary clock having a frequency $F_P$ and a secondary clock having a frequency $F_S$. The primary data is received over a fixed periodic interval $T_I$ and at a rate substantially equal to $F_P$. The amount of primary data received over $T_I$ is known to be N. The data relay stage is further configurable to provide secondary data via a secondary data interface based on the primary data and the secondary clock. The circuit also includes a phase-locked loop (PLL) circuit configurable to receive an interval reference signal having a frequency $F_I$ substantially equal to $1/T_I$. The PLL circuit is also configurable to provide the secondary clock based on the interval reference signal.

16 Claims, 7 Drawing Sheets

930

SETTING AND MINIMIZING A DERIVED CLOCK FREQUENCY BASED ON AN INPUT TIME INTERVAL

BACKGROUND

In data processing technologies, it is often the case that a system will read in a series of blocks of primary data, were each block is scanned in over a known interval. In such cases, the system will often then subsequently read and/or write some secondary data in response. Because such a system expects a new block of primary data at the beginning of each new interval, the system must read/write the secondary data in that same time interval, or else data buffers residing within the system will rapidly fill up and data will be lost. It is also often the case that the periodic interval may consist of an active duration, in which incoming data is received, and an inactive duration, where no data is received. The ratio of active to inactive durations is unknown, and therefore the instantaneous input data frequency relative to the interval is also unknown (but assumed to be fixed). The only known variable is the amount of data received per interval, N. The input timing of such a system is shown in timing diagram 100 of FIG. 1. An example of such a system is a video data interface in which the blanking interval is fixed, but may assume a wide range of values (from zero to $0.5T_I$, for example). Any dead time corresponds to an excessively high data frequency with respect to the allotted time for the transmission, i.e. the interval $T_I$, and any secondary frequency derived from this primary frequency is also excessive and inefficient.

FIG. 2 illustrates a system 200 with a primary (input) data interface 210 and derived (secondary or output) data interface 220, where the primary interface 210 operates at frequency $F_P$ of primary clock 250, has word width P, and an average data rate of $F_{PI}$ words per interval, $T_I$ ($F_{PI}=N*F_I$). The secondary interface 220 operates at frequency $F_S$ of secondary clock 260, has word width Q, and an average data rate of $F_{SI}$ words per interval, $T_I$ ($F_{SI}=M*F_I$). Note that, in general, the secondary interface 220 may be read, write, or read/write. Data throughput or frequency on the secondary interface 220 is total throughput of any combination of read or write data on the secondary interface 220.

In FIG. 2, the primary data is buffered by data buffer 230 and accessed at some later time. The secondary data rate may, generally, be transformed by the data gain stage 240. The data gain stage 240 is intended to represent any type of operation or transformation of the primary data that increases or reduces the effective data throughput of the secondary interface 220 by some fixed multiplier, $G_D$. Examples of such an operation include, but are not limited to, frame store (where a word read and word write must be performed for every word on the primary interface), data expansion, or reduction, through some mathematical transformation or table look-up, the a addition of overhead data words for packetizing, data compression, data packing, etc. Note that the data rate gain stage 240 may be schematically placed on either port (or both) of the data buffer without loss of generality.

For the general system of FIG. 2, if the objective is for the secondary data throughput to be greater than or equal to the primary data throughput, then the data throughput requirement on the secondary interface is given by the inequality $$F_{SI}Q \geq F_{PI}PG_D \quad (1)$$

For many systems, the primary and secondary interfaces use the same clock. This arrangement is illustrated by system 300 of FIG. 3. In this simplified case, $F_P$ and $F_S$ are identical and the only degree of freedom for compensating for the data rate gain is by adjusting the width of the secondary bus. In this case the only way to accommodate a higher secondary throughput is to increase the secondary bus width Q. Consequently, the inefficiency of the clock frequency of the primary interface 210 is translated directly to the secondary interface 220. This is a result of the fact that the dead time is not known a priori and may be nearly zero, so the secondary interface 220 must be designed to take this limiting condition into account. However, if the actual dead time is greater than this minimum, as is often the case, then the inefficiency of the primary interface is translated to the secondary interface.

FIG. 4 illustrates a system 400 that implements dual edge clocking. The only change from system 300 to system 400 is that in system 400 the secondary data is dual-edge clocked, modeled as a ×2 gain 470 on the secondary clock 460. This allows the secondary bus width Q to be reduced by a factor of 2 relative to system 300, but Q remains the sole method of increasing secondary bus throughput. This system also suffers from same inefficiency as system 300.

FIG. 5 illustrates a system 500 that implements a general multiplication function on the secondary clock. In system 500, the general multiplication function is performed by a "clock-locked" phase-locked loop (PLL) 570. The PLL 570 generates a secondary clock 560 frequency that proportional to the primary clock 250 and the modeling can generally include a 2× gain for secondary interface dual-edge clocking. This configuration has the advantage that an additional degree of freedom achieving the secondary throughput requirement, which can now be achieved using a combination of secondary interface width Q and the secondary clock frequency $F_S$. However, because of the zero-dead-time constraint, the inefficiency of the primary interface 210 is translated to the secondary interface 220 in this case, as in both system 300 and system 400.

FIG. 6 illustrates a timing diagram 600 for a timing system in which the secondary clock frequency $F_S$ is proportional to the primary clock frequency $F_P$. As stated above, because the secondary clock frequency $F_S$ is proportional to the primary clock frequency $F_P$, the secondary interface 220 will fall prey to the zero-dead-time constraint. Thus, the blanking time 612 of the primary data transmission 621 appears as blanking time 622 in the secondary data transmission 621. The excessive frequency seen in the secondary interface 220 translates into excessive power consumption and excessive heat generation. Furthermore, the excessively high secondary frequency may also require the use of unnecessarily fast external circuitry. For example, consider a secondary interface that transmits data at 300 MHz. Naturally, any external circuitry must also support clock speeds of up to 300 MHz. Now also consider that the secondary interface has a 50% blanking duration in its transmission interval. This means that the optimum frequency at which to transmit the secondary data is only 150 MHz. Thus, if the transmission speed at the secondary interface could be optimized, the external circuitry may only be required to support speeds up to 150 MHz.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

An embodiment of the present invention is directed to a circuit including a data relay stage configurable to receive primary data via a primary data interface, a primary clock having a frequency $F_P$ and a secondary clock having a frequency $F_S$. The primary data is received over a fixed periodic interval $T_I$ and at a rate substantially equal to $F_P$. The amount of primary data received over $T_I$ is known to be N. The data relay stage is further configurable to provide secondary data via a secondary data interface based on the primary data and the secondary clock. The circuit also includes a phase-locked loop (PLL) circuit configurable to receive an interval reference signal having a frequency $F_I$ substantially equal to $1/T_I$. The PLL circuit is also configurable to provide the secondary clock based on the interval reference signal.

Thus, the data rate (and clock frequency) $F_S$ of the secondary data interface is independent of the primary clock frequency $F_P$, and instead is dependent only the interval frequency $F_I$. The secondary clock frequency $F_S$ therefore scales directly with the interval frequency and generates the correct number of clock cycles per interval. Any zero-dead-time considerations are also removed, providing for maximum secondary bus efficiency. Maximum secondary bus efficiency translates into lower power consumption, lower heat generation, and, in some cases, lower speed requirements for circuitry coupled with the secondary data interface, which in turn leads to lower part cost.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Briefly stated, technology described herein provides a PLL-based architecture that minimizes the derived frequency of a secondary data interface based on a periodic interval over which a fixed and known amount of data is received. This periodic interval may consist of an active duration, in which incoming data is received, and an inactive duration, when no data is received. The ratio of active to inactive durations is unknown, and therefore the instantaneous input data frequency relative to the interval is also unknown (but assumed to be fixed). The only known variable is the amount of data received per interval, N.

Figure 1:
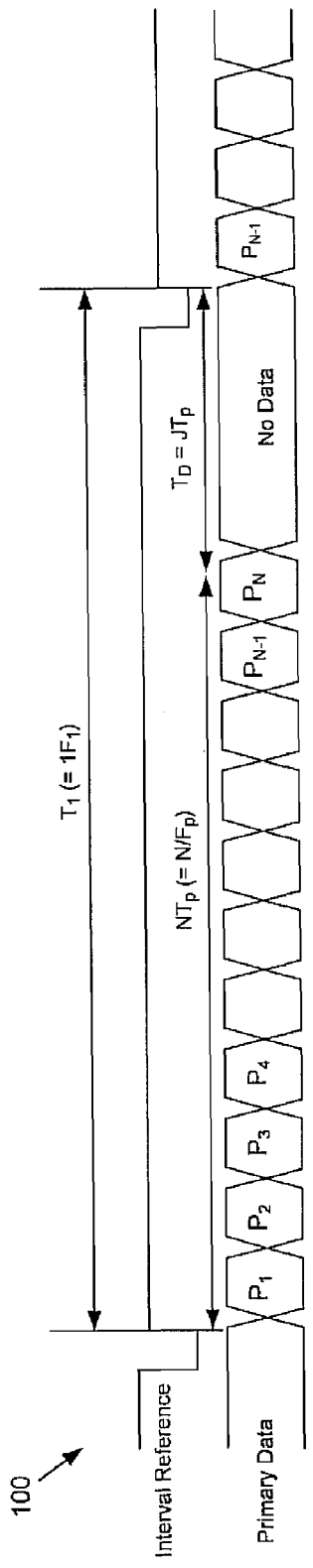
FIG. 1 is a timing diagram for a system that receives N words of primary data over an interval $T_I$.
Figure 2:
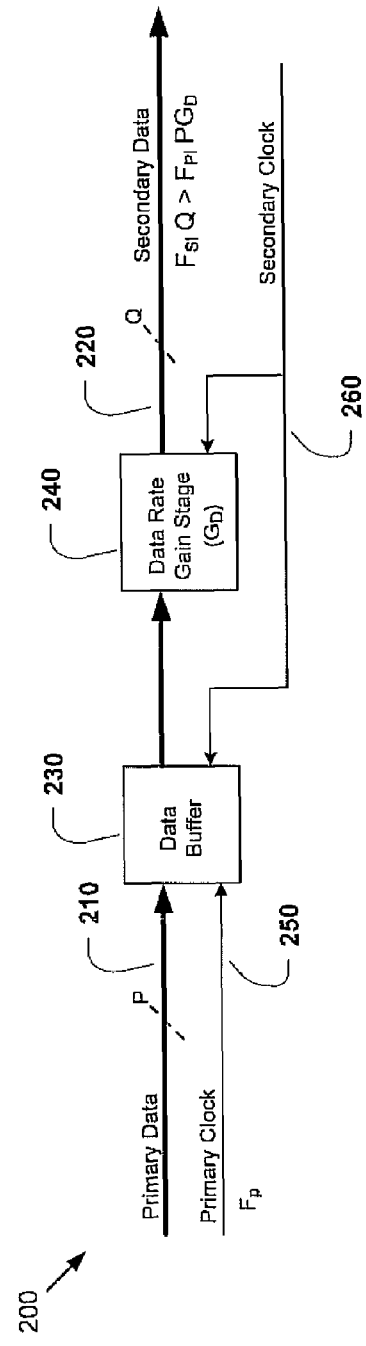
FIG. 2 illustrates a generalized system with a primary (input) data interface and derived (secondary or output) data interface.
Figure 3:
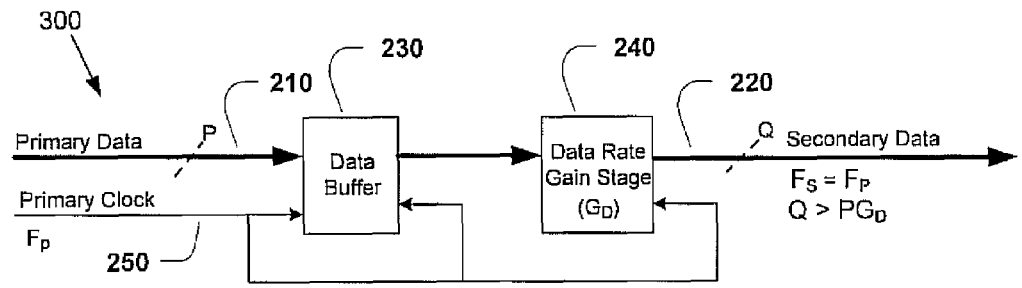
FIG. 3 illustrates a system with a primary (input) data interface and derived (secondary or output) data interface where both the primary and secondary interfaces use the same clock.
Figure 4:
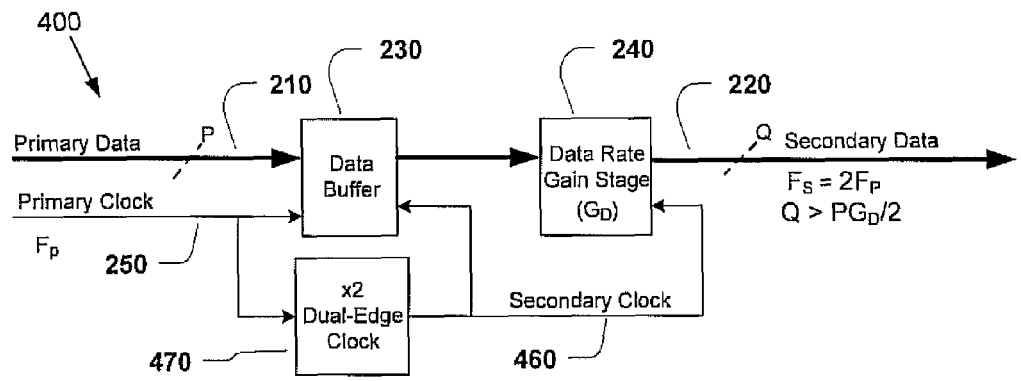
FIG. 4 illustrates a system with a primary (input) data interface and derived (secondary or output) data interface, where the system implements dual-edge clocking.
Figure 5:
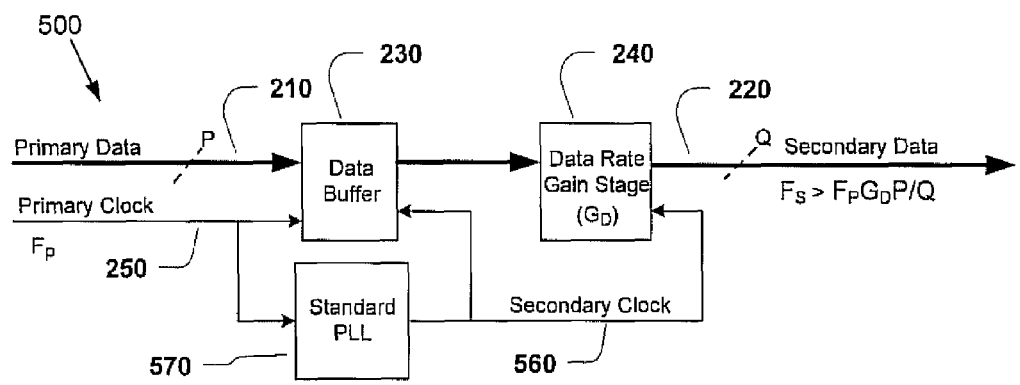
FIG. 5 illustrates a system with a primary (input) data interface and derived (secondary or output) data interface, where the system implements a general multiplication function on the secondary clock.
Figure 6:
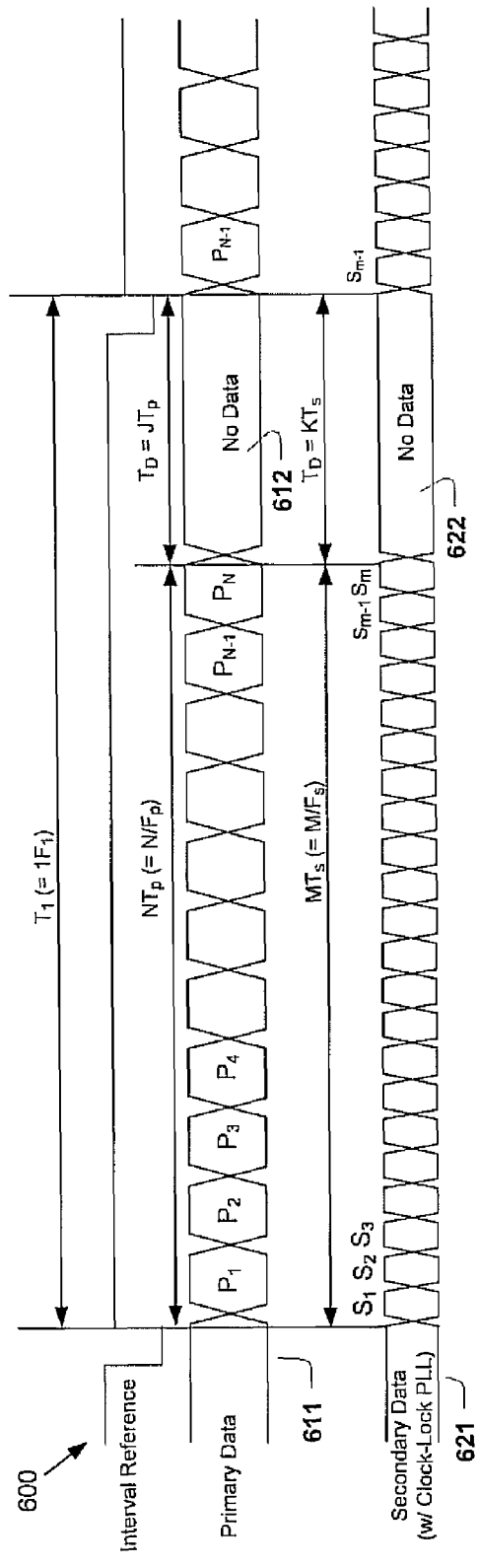
FIG. 6 is a timing diagram for a system that receives N words of primary data over an interval $T_I$, where the secondary clock frequency is proportional to the primary clock frequency.
Figure 7:
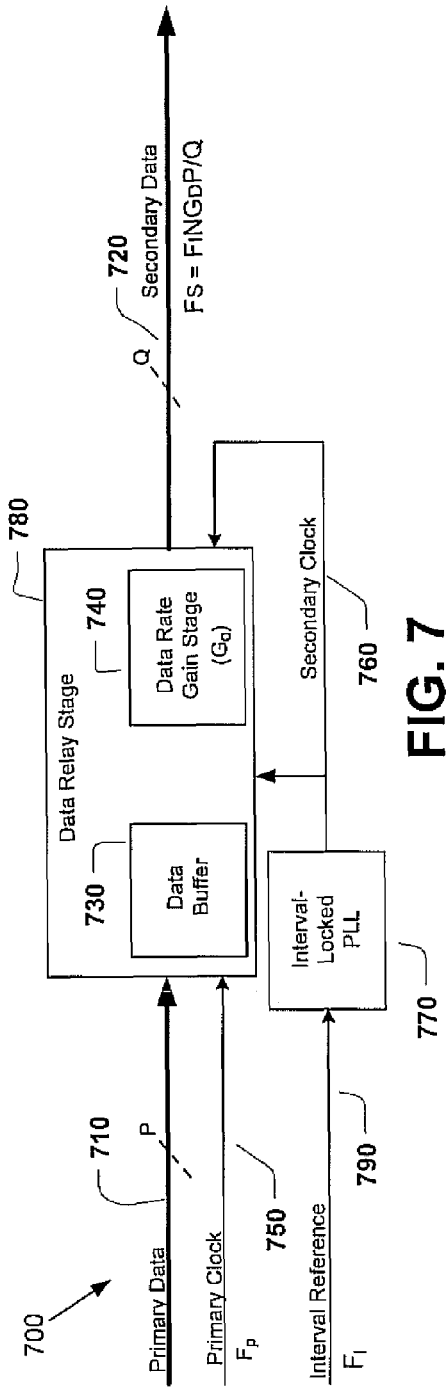
FIG. 7 illustrates a circuit, in accordance with various embodiments of the present invention.

FIG. 7 illustrates a circuit 700, in accordance with various embodiments of the present invention. Circuit 700 is well suited to be used in conjunction with a display device or any other device that similarly scans in primary data over a periodic interval and subsequently reads and/or writes some secondary data that is proportional in quantity to the primary data. Circuit 700 includes a data relay stage 780. Data relay stage 780 is configurable to receive a primary clock 750, a secondary clock 760, and primary data via a primary data interface 710. It is known that primary data interface 710 has a bus width P and the primary data is received generally over a fixed periodic interval $T_I$. Moreover, $T_I$ may include an active duration, in which the primary data is received, and an inactive duration, in which no data is received. In other words, the data relay stage 780 received no data for $NT_P < t < T_I$. Furthermore, it is known that the amount of primary data to be received over $T_I$ is known to be N. The primary data is also received at a frequency $F_P$, the frequency of primary clock 750, which is unknown a priori and may vary from application to application, but is assumed to be time-invariant within a specific application.

The data relay stage 780 is also configurable to read and/or write secondary data via a secondary data interface 720. The secondary data interface 720 may be read, write, or read/write. The amount of secondary data is known to be M, where M is proportional to N, and the secondary data interface 720 is known to have a bus width Q. The secondary data is provided over the secondary data interface 720 at a rate based on the frequency $F_S$ of the secondary clock 760.

In various embodiments, the data relay stage 780 includes a data buffer 734 for buffering data and a data rate gain stage 740 that represents a proportional increase or decrease in data throughput of the secondary data interface 720 by a gain $G_D$. Data rate gain stage 740 is intended to represent any type of operation or transformation occurring throughout circuit 700 that increases or reduces the effective data throughput of the secondary data interface 720 by the fixed multiplier $G_D$. Examples of such an operation may include, but are not limited to frame store (where a word read and word write must be performed for every word on the primary interface), data expansion, or reduction, through some mathematical transformation or table look-up, the addition of overhead data words for packetizing, data compression, data packing, etc. It should be appreciated that the functionality of data rate gain stage 740 is preserved whether the data rate gain stage 740 is coupled to an input of the data buffer 730 or an output of the data buffer 730 (or both in embodiments where multiple data rate gain stages are used).

Circuit 700 also includes a phase-locked loop (PLL) circuit 770. PLL circuit 770 is configurable to receive an interval reference signal 790 having a frequency $F_I$, which is substantially equal to $1/T_I$. In other words, the interval reference signal 790 marks the beginning and the end of interval $T_I$ for the PLL circuit 770 (e.g., by the rising edge). An example of the interval reference signal 790 may include, but is not limited to, a data enable signal. Based on the interval reference signal 790, the PLL circuit 770 is configurable to provide the secondary clock 760. By locking to the interval period (based on interval reference signal 790) instead of the primary clock 750, the frequency inefficiency that exists at the primary data interface 710 is prevented from propagating to the secondary data interface 720, and optimal efficiency can be achieved on the secondary data interface 720. Under ideal conditions, $F_S$ is the minimum frequency necessary to transmit the secondary data within the interval $T_I$. Put another way, because N, $G_D$, P, and Q are known in advance the above described circuitry can be used to define $F_S$ as:

$$F_S = F_I N G_D P/Q \quad (2)$$

Figure 8:
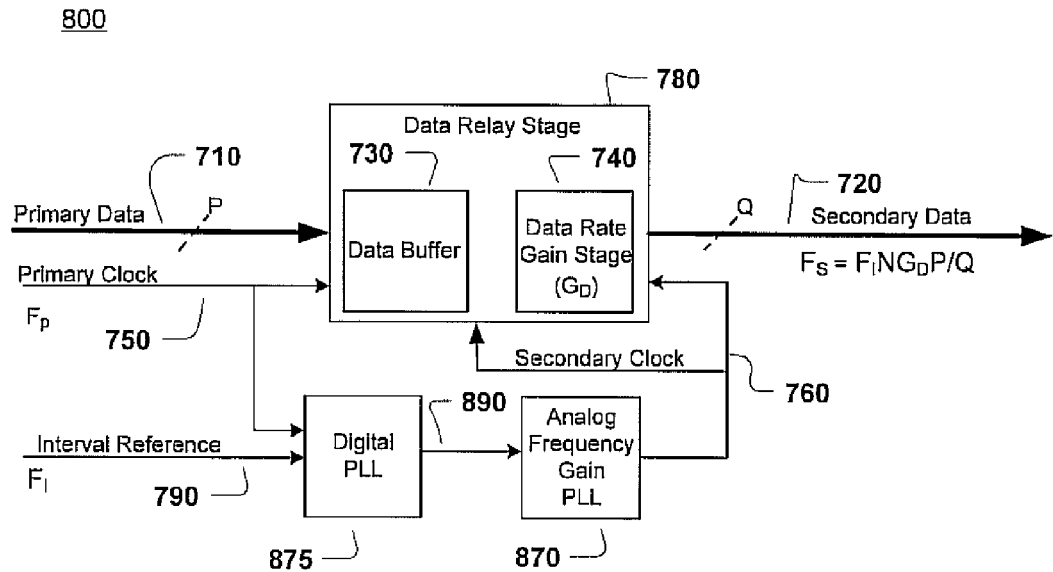
FIG. 8 illustrates an alternative circuit, in accordance with various embodiments of the present invention.

FIG. 8 illustrates a circuit 800, in accordance with various embodiments of the present invention. Circuit 800 is well suited to be used in conjunction with a display device or any other device that similarly scans in primary data over a periodic interval and subsequently reads and/or writes some secondary data that is proportional in quantity to the primary data. Circuit 800 includes a data relay stage 780. Data relay stage 780 is configurable to receive a primary clock 750, a secondary clock 760, and primary data via a primary data interface 710. It is known that primary data interface 710 has a bus width P and the primary data is received generally over a fixed periodic interval $T_I$. Moreover, $T_I$ may include an active duration, in which the primary data is received, and an inactive duration, in which no data is received. In other words, the data relay stage 780 receives no data for $NT_P < t < T_I$. Furthermore, it is known that the amount of primary data to be received over $T_I$ is known to be N. The primary data is also received at a frequency $F_P$, the frequency of primary clock 750, which is unknown a priori and may vary from application to application, but is assumed to be time-invariant within a specific application.

The data relay stage 780 is also configurable to read and/or write secondary data via a secondary data interface 720. The secondary data interface 720 may be read, write, or read/write. The amount of secondary data is known to be M, where M is proportional to N, and the secondary data interface 720 is known to have a bus width Q. The secondary data is provided over the secondary data interface 720 at a rate based on the frequency $F_S$ of the secondary clock 760.

In various embodiments, the data relay stage 780 includes a data buffer 730 for buffering data and a data rate gain stage 740 that represents a proportional increase or decrease in data throughput of the secondary data interface 720 by a gain $G_D$. Data rate gain stage 740 is intended to represent any type of operation or transformation occurring throughout circuit 800 that increases or reduces the effective data throughput of the secondary data interface 720 by the fixed multiplier $G_D$. Examples of such an operation may include, but are not limited to, frame store (where a word read and word write must be performed for every word on the primary interface), data expansion, or reduction, through some mathematical transformation or table look-up, the addition of overhead data words for packetizing, data compression, data packing, etc. It should be appreciated that the functionality of data rate gain stage 740 is preserved whether the data rate gain stage 740 is coupled to an input of the data buffer 730 or an output of the data buffer 730 (or both in embodiments where multiple data rate gain stages are used).

Circuit 800 also includes a digital PLL circuit 875. Digital PLL circuit 875 is configurable to receive an interval reference signal 790 having a frequency $F_I$, which is substantially equal to $1/T_I$. In other words, the interval reference signal 790 marks the beginning and the end of interval $T_I$ for the digital PLL circuit 875 (e.g., by the rising edge). An example of the interval reference signal 790 may include, but is not limited to, a data enable signal. Based on the interval reference signal 790, the digital PLL circuit 875 is configurable to provide an intermediate clock 890. Digital PLL circuit 875 allows for increased precision and stability in locking to the interval reference signal 790. However, digital PLL circuits like digital PLL circuit 875 typically cannot generate a clock (e.g., intermediate clock 890) that is faster than their input clock (e.g., primary clock 750). Therefore, circuit 800 also includes an analog PLL circuit 870 configurable to receive the intermediate clock 890 and provide the secondary clock 760 based on the intermediate clock 890. Analog PLL circuit 870 can be set to gain the frequency of the intermediate clock 890 up to the desired frequency $F_S$ of the secondary clock 760. By locking to the interval period (based on interval reference signal 790) instead of the primary clock 750, the frequency inefficiency that exists at the primary data interface 710 is prevented from propagating to the secondary data interface 720, and optimal efficiency can be achieved on the secondary data interface 720. Under ideal conditions, $F_S$ is the minimum frequency necessary to transmit the secondary data within the interval $T_I$. Put another way, because N, $G_D$, P, and Q are known in advance the above described circuitry can be used to define $F_S$ as shown in Equation 2.

Figure 9:
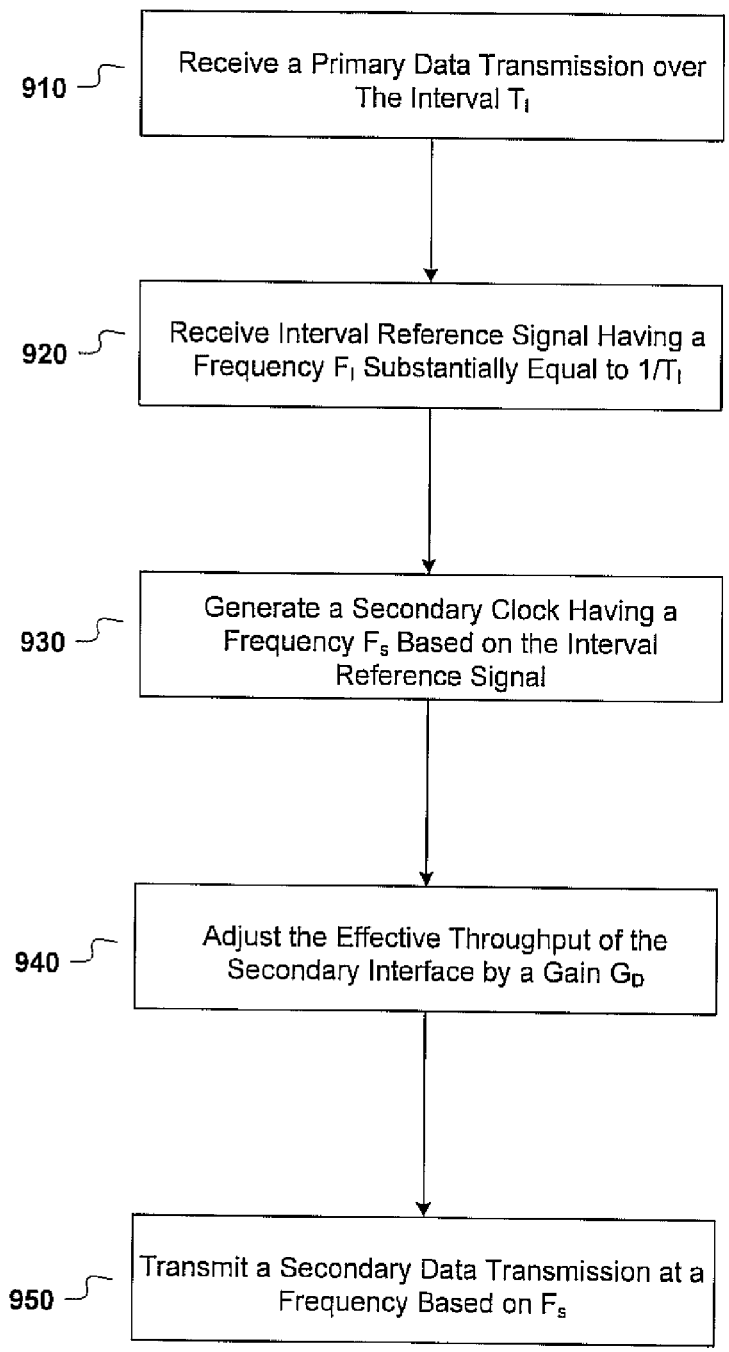
FIG. 9 illustrates a flowchart for a process for reducing dead time in a secondary data transmission, wherein the amount of data in the secondary data transmission is dependent upon the amount of data in a primary data transmission, in accordance with the various embodiments of the present invention.

FIG. 9 illustrates a flowchart for a process 900 for reducing dead time in a secondary data transmission, wherein the amount of data in the secondary data transmission is dependent upon the amount of data in a primary data transmission, in accordance with the various embodiments of the present invention. Block 910 involves receiving a primary data transmission on a primary data interface having a bus width P over the interval $T_I$. The primary data transmission is also received at a primary clock frequency of $F_P$. The primary data transmission includes an active duration where primary data is received. The amount of primary data received during the period $T_I$ is known to be N. The primary data transmission may also include an inactive duration, or "dead-space," where no data is received. In other words, no data is received for $NT_P < t < T_I$. This inactive duration is sometimes also referred to as a "blanking interval."

Block 920 involves receiving an interval reference signal having any frequency $F_I$ that is substantially equal to $1/T_I$. In other words, the interval reference signal marks the beginning and the end of the primary data transmission (e.g., a rising edge of the interval reference signal denotes the beginning of a new primary data transmission). An example of the interval reference signal 790 may include, but is not limited to, a data enable signal. Block 930 involves generating a secondary clock having a frequency $F_S$, based on the interval reference signal.

Figure 10:
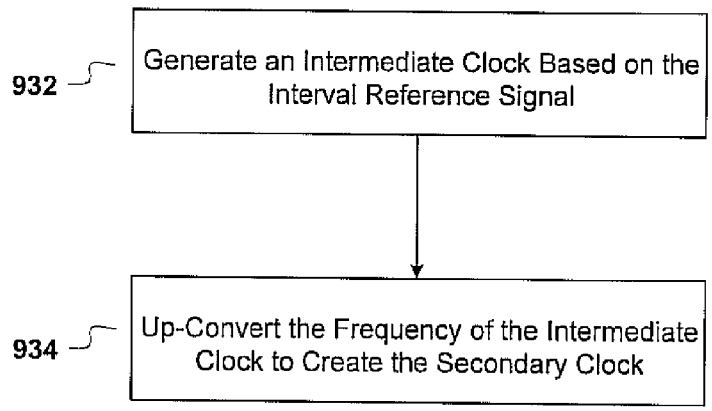
FIG. 10 illustrates a flowchart for a process for generating a secondary clock having a frequency $F_S$ based on the interval reference signal, in accordance with various embodiments of the present invention.

FIG. 10 illustrates a flowchart for a process 930 for generating a secondary clock having a frequency $F_S$, based on the interval reference signal, in accordance with various embodiments of the present invention. Block 932 involves generating an intermediate clock based on the interval reference signal. In one embodiment, the intermediate clock is generated with a digital PLL. However, digital PLL circuits typically cannot generate a clock (e.g., the intermediate clock) that is faster than their input clock (e.g., $F_P$). Next, the frequency of the intermediate clock is up-converted to create the secondary clock (block 934).

With reference again to FIG. 9, block 940 involves adjusting the effective throughput of the secondary interface by a gain $G_D$. Next, block 950 involves transmitting the secondary data transmission at a frequency based on $F_S$, over a secondary data interface having a bus width Q. Thus, the secondary data transmission is transmitted at a rate that is independent of the primary clock, and therefore the blanking interval of the primary data transmission is not translated to the secondary data transmission. Under ideal conditions, $F_S$, is the minimum frequency necessary to transmit the secondary data within the interval $T_I$. Put another way, because N, $G_D$, P, and Q are known in advance the above described circuitry can be used to define $F_S$, as shown in Equation 2.

Figure 11:
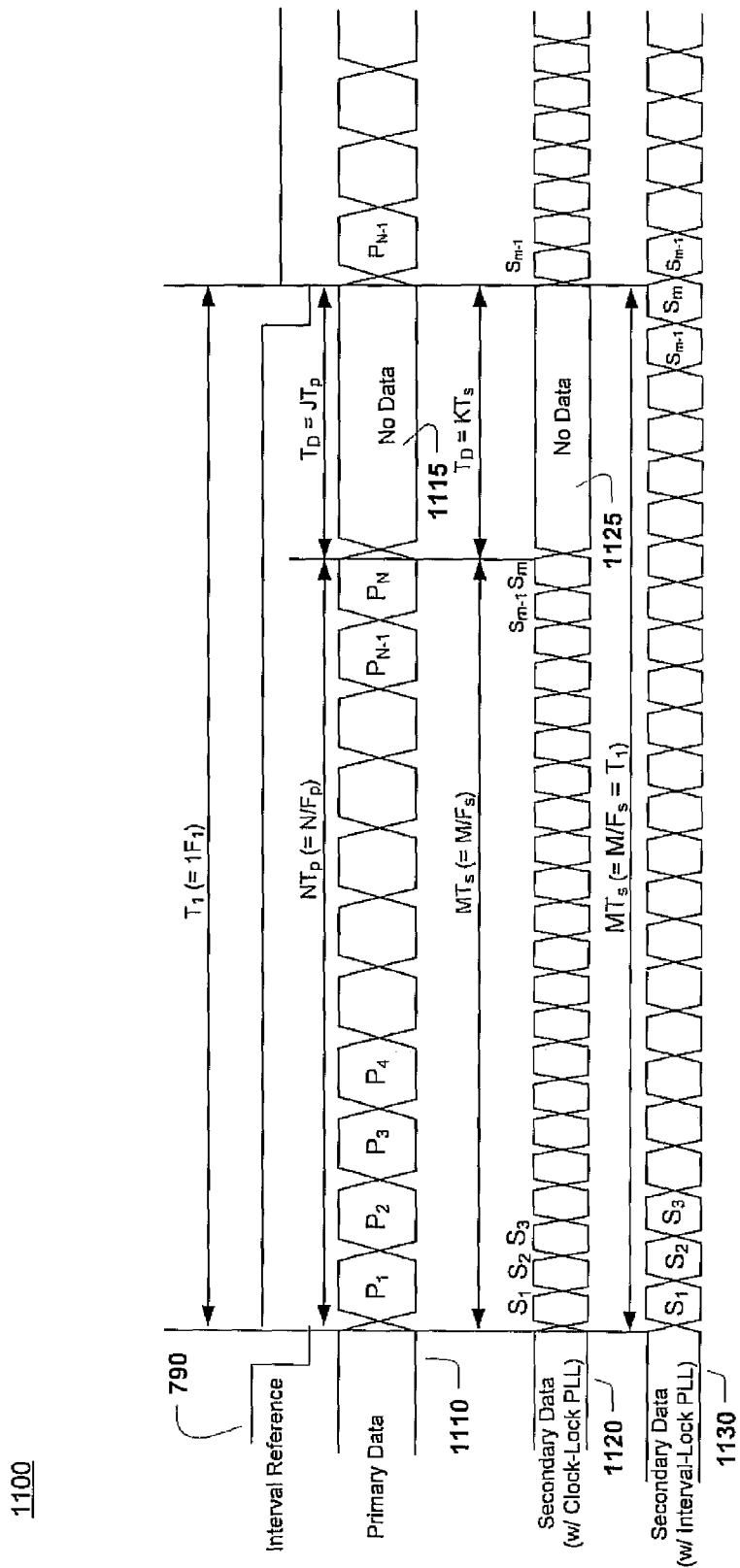
FIG. 11 shows a timing diagram, by a system that locks to an interval, in accordance with various embodiments of the present invention, as compared to a system that locks to a primary clock.

FIG. 11 shows a timing diagram 1100, illustrating the efficiency improvement and subsequent reduction of $F_S$. As stated above, primary data transmission 1110 has an active duration (denoted by primary data $P_I$-$P_N$) and an inactive duration 1115. In a system where the secondary clock is derived from the primary clock, the secondary data transmission 1120 of secondary data $S_I$-$S_M$ retains the same frequency inefficiency and therefore also contains an inactive duration 1125. Conversely, embodiments of the present invention, which involve the secondary clock 760 locking to an interval reference signal (such as interval reference signal 790), rather than a primary clock (such as primary clock 750), produce little or no dead space in the secondary data transmission 1130.

With the a priori knowledge of N, P, and Q, the precise number of required secondary clocks can be determined. The data rate (and clock frequency) $F_S$ of the secondary data interface now becomes independent of the primary clock frequency $F_P$, and instead is dependent only the interval frequency $F_I$. The secondary clock frequency $F_S$ therefore scales directly with the interval frequency and generates the correct number of clock cycles per interval. The zero-dead-time consideration referenced above is also removed, providing for maximum secondary bus efficiency. Maximum secondary bus efficiency translates into lower power consumption, lower heat generation, and, in some cases, lower speed requirements for circuitry coupled with the secondary data interface, which in turn leads to lower part cost.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A circuit comprising:
   a data relay stage configurable to receive primary data via a primary data interface, a primary clock having a frequency $F_P$ and a secondary clock having a frequency $F_S$, wherein the primary data is received over a fixed periodic interval $T_I$ and at a rate equal to $F_P$, wherein N is the known amount of primary data received over $T_I$, wherein the data relay stage is further configurable to provide secondary data via a secondary data interface based on the known amount of primary data received over $T_I$ and the secondary clock, wherein the $F_S$ is equal to or greater than the minimum frequency necessary to transmit the secondary data within the fixed periodic interval $T_I$; and
   a phase-locked loop (PLL) circuit configurable to receive a data enable signal having a frequency $F_I$ equal to $1/T_I$, the data enable signal marks the beginning and the end of the fixed periodic interval $T_I$, the PLL circuit being further configurable to provide the secondary clock based on the data enable signal, wherein the data relay stage is coupled to receive the secondary clock output by the PLL circuit, wherein the frequency of the secondary clock is independent of the frequency of the primary clock;
   wherein the data relay stage has a frequency gain $G_D$, wherein the primary data interface has a word width P, wherein the secondary data interface has a word width Q, wherein $F_S = F_I N G_D P/Q$.

2. The circuit as recited in claim 1 wherein the data relay stage comprises:
   a data buffer for buffering data.

3. The circuit as recited in claim 1 wherein the interval required to transmit the primary data is less than the fixed periodic interval $T_I$.

4. The circuit as recited in claim 2 wherein the primary clock has a period $T_P$ and the data buffer receives no data for an inactive duration of $T_I$.

5. The circuit as recited in claim 1 wherein the data enable signal is derived from the primary data interface.

6. The circuit as recited in claim 1 wherein the frequency $F_P$ of the primary clock is an unknown, underivable value.

7. The circuit as recited in claim 1 wherein a rising edge of the data enable signal corresponds to the start of the primary data.

8. The circuit as recited in claim 1 wherein the data relay stage is configurable to provide the secondary data to a display device.

9. A circuit comprising:
   a data relay stage configurable to receive primary data via a primary data interface, a primary clock having a frequency $F_P$ and a secondary clock having a frequency $F_S$, wherein the primary data is received over a fixed periodic interval $T_I$ and at a rate equal to $F_P$, wherein N is the known amount of primary data received over $T_I$, wherein the data relay stage is further configurable to provide secondary data via a secondary data interface based on the known amount of primary data received over $T_I$ and the secondary clock, wherein the frequency $F_S$ of the secondary clock is equal to or greater than the minimum frequency necessary to transmit the secondary data within the fixed periodic interval $T_I$;
   a digital phase-locked loop (PLL) configurable to receive a data enable signal having a frequency $F_I$ equal to $1/T_I$, the data enable signal marks the beginning and the end of the fixed periodic interval $T_I$, the digital PLL configurable to provide an intermediate clock based on the data enable signal; and an analog PLL configurable to receive the intermediate clock and provide the secondary clock based on the intermediate clock, wherein the data relay stage is coupled to receive the secondary clock output by the analog PLL circuit, wherein the frequency of the secondary clock is independent of the frequency of the primary clock;

wherein the data relay stage has a frequency gain $G_D$, wherein the primary data interface has a word width P, wherein the secondary data interface has a word width Q, wherein $F_S = F_I N G_D P/Q$.

10. The circuit as recited in claim 9 wherein the data relay stage comprises:

a data buffer for buffering data.

11. The circuit as recited in claim 10 wherein the interval required to transmit the primary data is less than the fixed periodic interval $T_I$.

12. The circuit as recited in claim 11 wherein the primary clock has a period $T_P$ and the data buffer receives no data for an inactive duration of $T_I$.

13. The circuit as recited in claim 9 wherein the data enable signal is derived from the primary data interface.

14. The circuit as recited in claim 9 wherein the frequency $F_P$ of the primary clock is an unknown, underivable value.

15. The circuit as recited in claim 9 wherein a rising edge of the data enable signal corresponds to the start of the primary data.

16. The circuit as recited in claim 9 wherein the data relay stage is configurable to provide the secondary data to a display device.

* * * * *